(12) United States Patent
Hwang (10) Patent No.: US 7,778,413 B2
(45) Date of Patent: Aug. 17, 2010

(54) CRYPTOGRAPHIC SYSTEM AND METHOD FOR ENCRYPTING INPUT DATA

(75) Inventor: Joon-ho Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1302 days.

(21) Appl. No.: 11/285,193

(22) Filed: Nov. 23, 2005

(65) Prior Publication Data
US 2007/0076864 A1 Apr. 5, 2007

(30) Foreign Application Priority Data
Nov. 24, 2004 (KR) .................. 10-2004-0097015

(51) Int. Cl.
*H04L 9/00* (2006.01)
(52) U.S. Cl. ........................................ 380/29
(58) Field of Classification Search .................. 380/29
See application file for complete search history.

(56) References Cited

U.S. PATENT DOCUMENTS 6,724,894 B1   4/2004   Singer

2002/0025035 A1*  2/2002  Rivest et al. .................. 380/42
2004/0143747 A1   7/2004  Eckstein et al.
2005/0055596 A1*  3/2005  Abe et al. ..................... 713/500

FOREIGN PATENT DOCUMENTS

JP   2003-208097   7/2003

* cited by examiner

*Primary Examiner*—Kambiz Zand
*Assistant Examiner*—Aubrey H Wyszynski
(74) *Attorney, Agent, or Firm*—Harness, Dickey & Pierce, P.L.C.

(57) ABSTRACT

A cryptographic system for encrypting input data in accordance with an encryption algorithm having a repeated-round structure may include an encryption unit updating and storing encrypted data in accordance with the encryption algorithm in each given round, and outputting the encrypted data after executing the encryption for a given number of rounds. The system may include a compensation unit generating and storing compensation data so that a sum of a Hamming distance for the updated and stored data and a Hamming distance of the compensation data is maintained at a constant value.

20 Claims, 6 Drawing Sheets

| ROUND | REGISTER | HAMMING DISTANCE | COMPENSATION REGISTER | HAMMING DISTANCE |
|---|---|---|---|---|
| 0 | 01010110 |  | 01010110 |  |
| 1 | 11110011 | 4 | 00001100 | 4 |
| 2 | 00111000 | 5 | 00111000 | 3 |
| 3 | 11100110 | 6 | 00011001 | 2 |
| 4 | 10000010 | 3 | 10000010 | 5 |

| ROUND | FIRST REGISTER | HAMMING DISTANCE | FIRST COMPENSATION REGISTER | HAMMING DISTANCE | SECOND REGISTER | HAMMING DISTANCE | SECOND COMPENSATION REGISTER | HAMMING DISTANCE |
|---|---|---|---|---|---|---|---|---|
| 0 | 01100101 | / | 10011010 | / | 01010110 | / | 01010110 | / |
| 1 | 11100101 | 1 | 11100101 | 7 | 11110011 | 4 | 00001100 | 4 |
| 2 | 00111010 | 7 | 11000101 | 1 | 00111000 | 5 | 00111000 | 3 |
| 3 | 00101101 | 4 | 00101101 | 4 | 11100110 | 6 | 00011001 | 2 |
| 4 | 01011001 | 4 | 10100110 | 4 | 10000010 | 3 | 10000010 | 5 |

FIG. 6

CRYPTOGRAPHIC SYSTEM AND METHOD FOR ENCRYPTING INPUT DATA

PRIORITY STATEMENT

This application claims the priority of Korean Patent Application No. 2004-97015, filed on Nov. 24, 2004, in the Korean Intellectual Property Office, the disclosure of which is incorporated herein in its entirety by reference.

BACKGROUND OF THE INVENTION

1. Field of the Invention

The present invention relates in general to a cryptographic system and method for encrypting input data.

2. Description of the Related Art

In general, a public key cryptographic system may be implemented based on theoretical security using prime factorization or discrete algebra. For example, public key cryptographic systems may employ schemes using an encryption key that is typically difficult to be factorized. Example schemes using a certain encryption key that is difficult to solve using discrete algebra include the Rivest-Shamir-Adelman (RSA) scheme, the Diffie-Hellman scheme, ElGamal scheme, etc. Since public key cryptographic systems handling these mathematical difficulties perform an operation with bit numbers greater than 512 bits, the prior art cryptographic systems using such schemes typical may have what is referred to as a repeated-round structure.

Recently, block cryptographic systems, which have a repeated-round structure, have been used, where a round may be understood as a given encryption processing iteration for data to be encrypted. A block cryptographic system is a non-public key (symmetric key) cryptographic system which encrypts data by dividing the data into blocks of a given size. After generating a plurality of sub-round keys using a given encryption key, the block cryptographic system with repeated-round structure repeatedly encrypts data using each of the sub-round keys.

Block cryptographic systems may be implemented using a given encryption algorithm. Generally used encryption algorithms may be defined by known encryption standards, for example. Typical block encryption algorithms include the data encryption standard (DES), used in the United States, the international data encryption algorithm (IDEA) used in Europe, the SEED used in Korea, etc. All standardized encryption algorithms are published, and users may implement encryptions systems using the encryption algorithms provided by these published standards.

Figure 1:
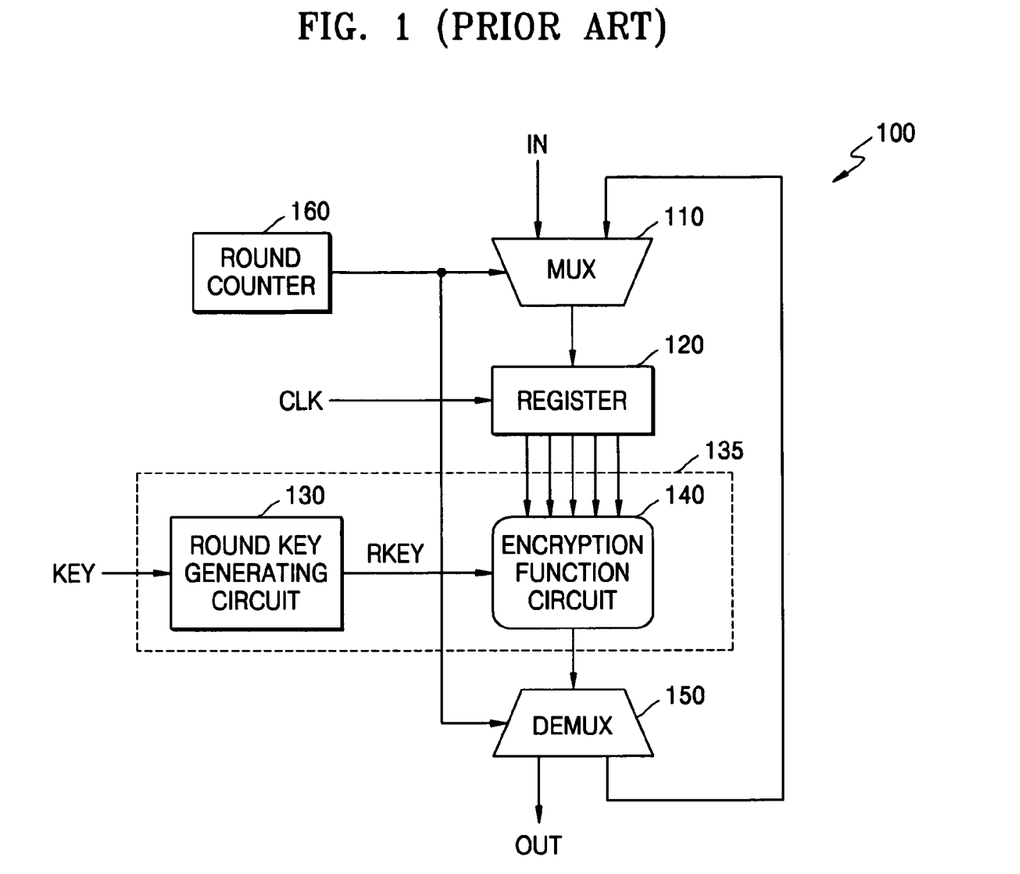
FIG. 1 is a block diagram of a prior art cryptographic system with a repeated-round structure.

FIG. 1 is a block diagram of a prior art cryptographic system with a repeated-round structure. The prior art cryptographic system 100 typically may include an input unit 110, a register 120, an encryption circuit 135, an output unit 150 and a round counter 160. The input unit 110 receives data to be encrypted in every round, i.e., the input unit 110 receives data to be encrypted in a first round, and in subsequent rounds receives the data that was encrypted in a previous round.

The register 120 stores the data output from the input unit 110 in response to a clock signal. In the first round, the data to be encrypted is stored in the register 120, and in the subsequent rounds, the data encrypted in a previous round is updated and stored in the register 120. The encryption circuit 135 encrypts the data stored in the register 120 using a given encryption key (KEY). The encryption circuit 135 includes a round key generating circuit 130 and an encryption function circuit 140.

The round key generating circuit 130 generates a round key (RKEY), which is used for encryption in every round, using a given KEY. The encryption function circuit 140 implements an encryption function which is part of a given encryption algorithm. The encryption function circuit 140 encrypts the data stored in the register 120 using the RKEY based on the given encryption function.

In a final round, the output unit 150 outputs the data encrypted by the encryption function circuit 140. In previous rounds, the output unit 150 transmits the data encrypted by the encryption function circuit 140 to the input unit 110. The round counter 160 counts the number of rounds performed, and transmits a count as a control signal to the input unit 110 and output unit 150. The round counter 160 may be reset in response to the encrypted data outputted by the output unit 150. The round counter 160 may start counting in response to the input of the data to be encrypted. The round counter 160 may increase the count in response to the encrypted data transmitted from the output unit 150.

As described above, the prior art public key cryptographic system is based on theoretical security using discrete algebra, prime factorization, etc. The prior art block cryptographic system implements encryption based on theoretical security such as Shannon's theory (diffusion and confusion). However, attacks have been recently developed which may threaten cryptographic systems by exploiting side information from the cryptographic systems regardless of the theoretical security that is used.

These attacks threatening cryptographic systems by exploiting side information are referred to as 'side channel' attacks. A side channel attack includes a timing attack which exploits an operation performing time, a power analysis attack which exploits the amount of power consumption, and a fault attack which uses an intentional fault. For example, the power analysis attack can attack a cryptographic system used for a smart card with relatively little effort and cost, and is thus a substantial potential threat to security.

The power analysis attack may be known as a simple power analysis (SPA) attack or a differential power analysis (DPA) attack, for example. The SPA attack infers secret information simply by analyzing a power signal while a cryptographic system operates. The DPA attack infers secret information by analyzing a substantial number of power signals related to the same secret key. This analysis may be done by using a statistical property.

Several technologies have been proposed for designing a cryptographic system that is secure against power analysis attacks. These technologies fundamentally include a method or process which reduces the size of a signal, inserting noise, or which employs a random clock or a random execution order, for example. However, if there are sufficient samples of power signals to be analyzed, a random component cancels out. Accordingly, the conventionally proposed technologies cannot be perfectly secure against power analysis attacks.

In another proposal, a masking technique, which is different from technologies using a random component, has been developed. In the masking technique, an internal operation is performed by masking input data with random data and then removing the mask. The masking technique has a structure which is generally secure against SPA attacks and DPA attacks. However, if the internal operation is non-linear, a complicated additional circuit is required, and masking circuits suitable for each encryption algorithm should be designed.

In addition, the power analysis attack can be used to determine a correlation with secret information by measuring the power consumption of a logic circuit, such as an S-box in a block cryptographic system. The S-box, which is a non-linear substitution function, uses an algorithm to convert input data to other data and to output the other data. However, since it is difficult practically to measure the power consumption of the S-box, the power consumption cannot be used for the power analysis attack.

On the contrary, it is easier to measure power consumption due to a switching current in the register in which data encoded every round is updated and store, rather than to measure the power consumption of the S-box. Thus, a measurement of the power consumption of the register is frequently used as a representation of a measure in changes in the power consumed by the cryptographic system.

Referring FIG. 1, the data stored in the register 120 in a previous round is updated to new encrypted data in a following round. The power analysis attack is conducted using the current, which changes as the data is updated in the register 120. Meanwhile, the switching current in a register has a high correlation with a Hamming distance of data bits. The Hamming distance indicates the number of bits of updated data which have different values than bits of the previous data. For example, if a value stored in the register is updated from 1100 to 1010, the number of bits which have different values than bits of the previous data is 2. The Hamming distance is thus 2.

Accordingly, the more bits that change values as data stored in a register is updated, the greater the increase in power consumption. In other words, as the Hamming distance increases, the power consumption increases. Since a power analysis attack involves attacking a cryptographic system using the changes in power consumed in a register, it may be desirable to maintain constant power consumption. Hence, it may be desirable to maintain the Hamming distance constant as data stored in a register is updated.

SUMMARY OF THE INVENTION

An example embodiment of the present invention is directed to a cryptographic system for encrypting input data in accordance with an encryption algorithm having a repeated-round structure. The system may include an encryption unit updating and storing encrypted data in accordance with the encryption algorithm in each given round, and outputting the encrypted data after executing encryption for a given number of rounds. The system may include a compensation unit generating and storing compensation data so that a sum of a Hamming distance for the updated and stored encrypted data and a Hamming distance of the compensation data is maintained at a constant value.

Another example embodiment of the present invention is directed to a cryptographic system for encrypting input data by dividing the input data into a first block and a second block in accordance with an encryption algorithm having a repeated-round structure. The system may include an encryption unit updating and storing data, in each round, for each of the first and second blocks encrypted in accordance with the encryption algorithm, and outputting the encrypted data after executing encryption for a given number of rounds. The system may include a compensation unit generating and storing first compensation data and second compensation data such that the sum of a Hamming distance for the updated and stored encrypted data of the first block and first compensation data is maintained at a constant value, and so that the sum of the Hamming distance for the updated and stored encrypted data of the second block and the second compensation data is maintained at a constant value.

Another example embodiment of the present invention is directed to a method of encrypting input data in accordance with an encryption algorithm having a repeated-round structure. In the method, stored data may be encrypted in accordance with the encryption algorithm in each round. Compensation data may be generated o that a sum of a Hamming distance for the encrypted data and compensation data is maintained at a constant value. The compensation data may be simultaneously with the encrypted data based on a clock signal.

Another example embodiment of the present invention is directed to a repeated-round cryptographic system. The system may include an encryption unit updating and storing encrypted data in each given round of encryption, and outputting the encrypted data after executing encryption for a given number of rounds. The system may include a compensation unit compensating for a difference in current that is generated as the encrypted data is updated and stored.

Another example embodiment of the present invention is directed to a method of encrypting input data in accordance with a repeated-round encryption algorithm. In the method, stored data may be encrypted in accordance with the algorithm in each round of encryption, and compensation data may be generated to compensate for a difference in current that is generated as the encrypted data is updated and stored.

Another example embodiment of the present invention is directed to a computer program product. The computer program product may include a computer-readable medium having computer program logic stored thereon for enabling a processor of a cryptographic system invoking a repeated-round encryption algorithm to encrypt input data. The computer program logic may cause the processor to perform the functions of encrypting stored data in accordance with the algorithm in each round of encryption, and generating compensation data to compensate for a difference in current that is generated as the encrypted data is updated and stored.

Another example embodiment of the present invention is directed to a compensation unit of a cryptographic system for encrypting input data in accordance with an encryption algorithm having a repeated-round structure. The compensation unit may include a compensation data generating unit generating compensation data based on the number of rounds performed, the compensation data compensating for a difference in current that is generated as the encrypted data is updated and stored, and a compensation register storing the compensation data in response to a clock signal.

Another example embodiment of the present invention is directed to a compensation unit of a cryptographic system for encrypting input data in accordance with an encryption algorithm having a repeated-round structure. The compensation unit may be configured to generate compensation data to compensate for a difference in current that is generated as the encrypted data is updated and stored.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments the present invention.

DETAILED DESCRIPTION OF THE EXAMPLE EMBODIMENTS

As to be discussed in more detail hereafter, the example embodiments of the present invention are directed to a cryptographic method and system which may be more secure against side channel attacks. The example cryptographic system may have a repeated-round structure, and may maintain the Hamming distance constant by generating compensation data. The compensation data may compensate for a change in current generated due to a change in the Hamming distance of encrypted data, as the encrypted data is updated and stored in every round and/or encryption processing iteration.

As will be shown hereafter, to implement a cryptographic system that is secure against a power analysis attack, the example methodology may employ a statistical correlation between the Hamming distance and power consumption. The Hamming distance is maintained constant as data stored in a register is updated. For example, a separate compensation register may be used to compensate for the difference in current generated as the data stored in the register is updated, allowing a constant current to flow through the entire system.

In the following example embodiments of the present invention, a compensation register may be employed, which is the same size (capacity) as a typical register in the prior art cryptographic system ('system register'). Further, the Hamming distance may be half the sum of the combined memory capacity or size of the system register and compensation register.

As an example, if the capacity of the system register is 32 bits, the capacity (or size) of the compensation register is 32 bits, and the Hamming distance is thus 32 bits. In another example, if the Hamming distance of data is 12 bits, the Hamming distance of data stored in the compensating resister should be 20 bits, for a total Hamming distance of 32 bits. Therefore, the Hamming distance of the data updated and stored in a 64-bit total register (combined capacity or size of the system and compensation registers) of the cryptographic system remains unchanged.

Figure 2:
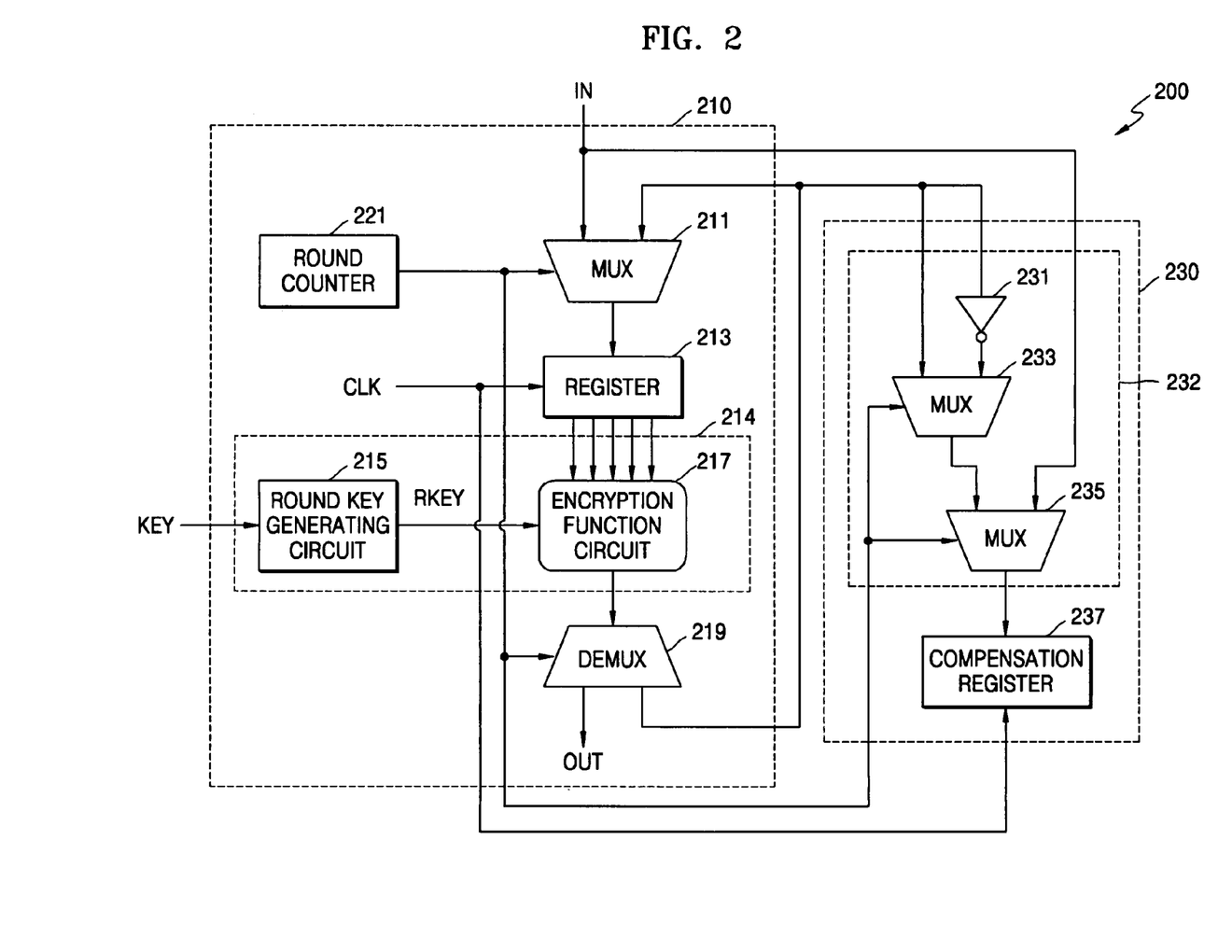
FIG. 2 is a block diagram of a cryptographic system with repeated-round structure according to an example embodiment of the present invention.

FIG. 2 is a block diagram of a cryptographic system with a repeated-round structure according to an example embodiment of the present invention. The cryptographic system 200 may include an encryption unit 210 and a compensation unit 230. The encryption unit 210 may encrypt data during each given round (or processing iteration) using a given encryption algorithm. The encrypted data may be updated and stored during every round. The compensation unit 230 generates and stores compensation data for compensating the encrypted data to be updated and stored by the encryption unit 210 in each round.

In an example, the compensation data may be at a value so as to maintain the sum of the Hamming distance of the encrypted data and Hamming distance of the compensation data at a given value. Further, the compensation data and the encrypted data may be stored in synchronization with a clock signal.

The encryption unit 210 shown in FIG. 2 is the same as that illustrated in FIG. 1. As the operation of each of the elements included in the encryption unit 210 is identical to the operation of the corresponding elements included in the conventional cryptographic system 100 of FIG. 1, a detailed description of operation is omitted herein for purposes of brevity.

The compensation unit 230 may include a compensation data generating unit 232 and a compensation register 237. The compensation data generating unit 232 may be configured to generate compensation data to compensate for the encrypted data that is updated and stored in each round. The compensation data alternately may have the values of the updated data that is stored in a register 213, and an inverted value of the updated data stored in the register 213 during each consecutive round. The compensation data may be initialized as data to be encrypted.

In an example, if the example cryptographic system 200 has an 8-bit register, and if the Hamming distance of the data that is updated and stored after being encrypted in a first round is represented as n, the Hamming distance of the compensation data is (8-n). Additionally, the compensation data may have inverted values of the encrypted data.

In an example, if the Hamming distance of data that is updated and stored after being encrypted in a following round is m, the Hamming distance of the compensation data is (8-m). At this time, since compensation data of a previous round has inverted values of the data that was encrypted in the previous round, the compensation data may have twice-inverted values of the encrypted data, or in other words, the same value as the encrypted data.

Thus, if the value of data which is updated and stored after being encrypted in an $i^{th}$ round is denoted by Ri, the values of the data updated and stored in the encryption unit 210 may be as shown in expression (1):

$$R0 \rightarrow R1 \rightarrow R2 \rightarrow R3 \rightarrow R4 \rightarrow \qquad (1)$$

Corresponding to this data, the values of the updated and stored compensation data may be as shown in expression (2). In expression (2), '~R1' denotes the inverted value of R1.

$$R0 \rightarrow \sim R1 \rightarrow R2 \rightarrow \sim R3 \rightarrow R4 \rightarrow \qquad (2)$$

If the data updated and stored in the encryption unit 210 contains x bits, the compensation data contains x bits, and the Hamming distance is maintained at x bits. Therefore, the current generated when updating and storing data in the cryptographic system 200 is constant, so that the cryptographic system 200 can guard against a power analysis attack, for example.

Referring again to FIG. 2, the compensation register 237 may store the compensation data generated in response to the clock signal. To maintain the constant Hamming distance, the compensation data may be stored in the compensation register 237 simultaneously with the encrypted data being stored in the register 213.

The compensation data generating unit 232 may include an inverting unit 231, a first selecting circuit 233 and a second selecting circuit 235. The inverting unit 231 inverts the data transmitted from an output unit 219 (such as a multiplexer) of the encryption unit 210 during each round. The first selecting circuit 233 alternately may select one of the data transmitted from the output unit 219 of the encryption unit 210 and the output of the inverting unit 231. In an example, the first selecting circuit 233 selects the output of the inverting unit 231 during odd-numbered rounds, and selects the data transmitted from the output unit 219 of the encryption unit 210 in even-numbered rounds.

The second selecting circuit 235 selects one of the output of the first circuit 233 or the data to be encrypted. The compensation register 237 may be initialized to the original data which has not yet been encrypted. Therefore, the second selecting circuit 235 selects the data to be encrypted only in the first round, and selects the output of the first selecting circuit 233 in each subsequent round.

Figure 3:
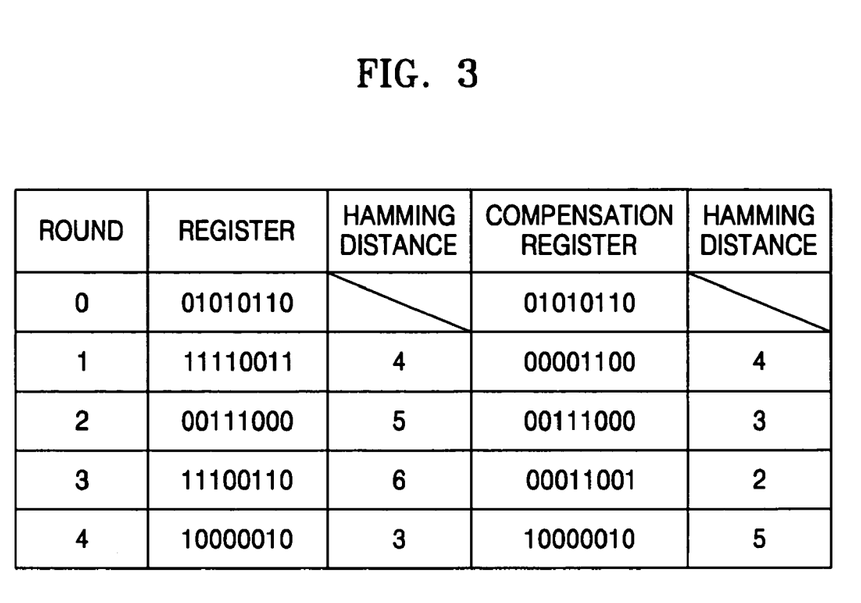
FIG. 3 is a table showing data values stored in the register of the cryptographic system illustrated in FIG. 2.

FIG. 3 is a table showing data values stored in the register of the cryptographic system 200 illustrated in FIG. 2. The example values shown in the table of FIG. 3 are for an example capacity or size of 8 bits for each of the register 213 and the compensation register 237, and where the Hamming distance is 8 bits.

To illustrate an example encryption process flow, the register 213 and the compensation register 237 are initialized to data (01010110) which is to be encrypted. In the first round, if the data previously stored in the register 213 is encrypted using a given encryption algorithm resulting in an example value of 11110011, the encrypted value (11110011) is updated and stored in the register 213. Meanwhile, the inverted value (00001100) of the encrypted data is stored in the compensation register 237.

At this time, the Hamming distance of the updated data (01010110→11110011) stored in the register 213 is 4 bits, and the Hamming distance of the updated data (01010110→00001100) stored in the compensation register 237 is 4bits. Therefore, the total Hamming distance of the updated data stored in registers 213 and 237 is 8 bits.

In the second round, the data (11110011) stored in the register 213 is encrypted using the given encryption algorithm, resulting in the value 00111000, and the encrypted value (00111000), is updated and stored in the register 213. Meanwhile, the twice-inverted value of the encrypted data, that is, the encrypted data value (00111000) is stored in the compensation register 237.

At this time, the Hamming distance of the updated data (11110011→00111000) stored in the register 213 is 5 bits, and the Hamming distance of the updated data (00001100→00111000) stored in the compensation register 237 is 3bits. Therefore, the Hamming distance of the updated data stored in the total registers 213 and 237 of the cryptographic system 200 is 8 bits, which is identical to the Hamming distance of the updated data stored in the first round.

Thereafter,the updated data stored in the compensation register 237 alternately has the same value as the updated data stored in the register 213 and the inverted value of the updated data stored in the register 231. Thus, the Hamming distance of the updated data stored in registers 213 and 237 can be maintained at a constant 8 bits.

Figure 4:
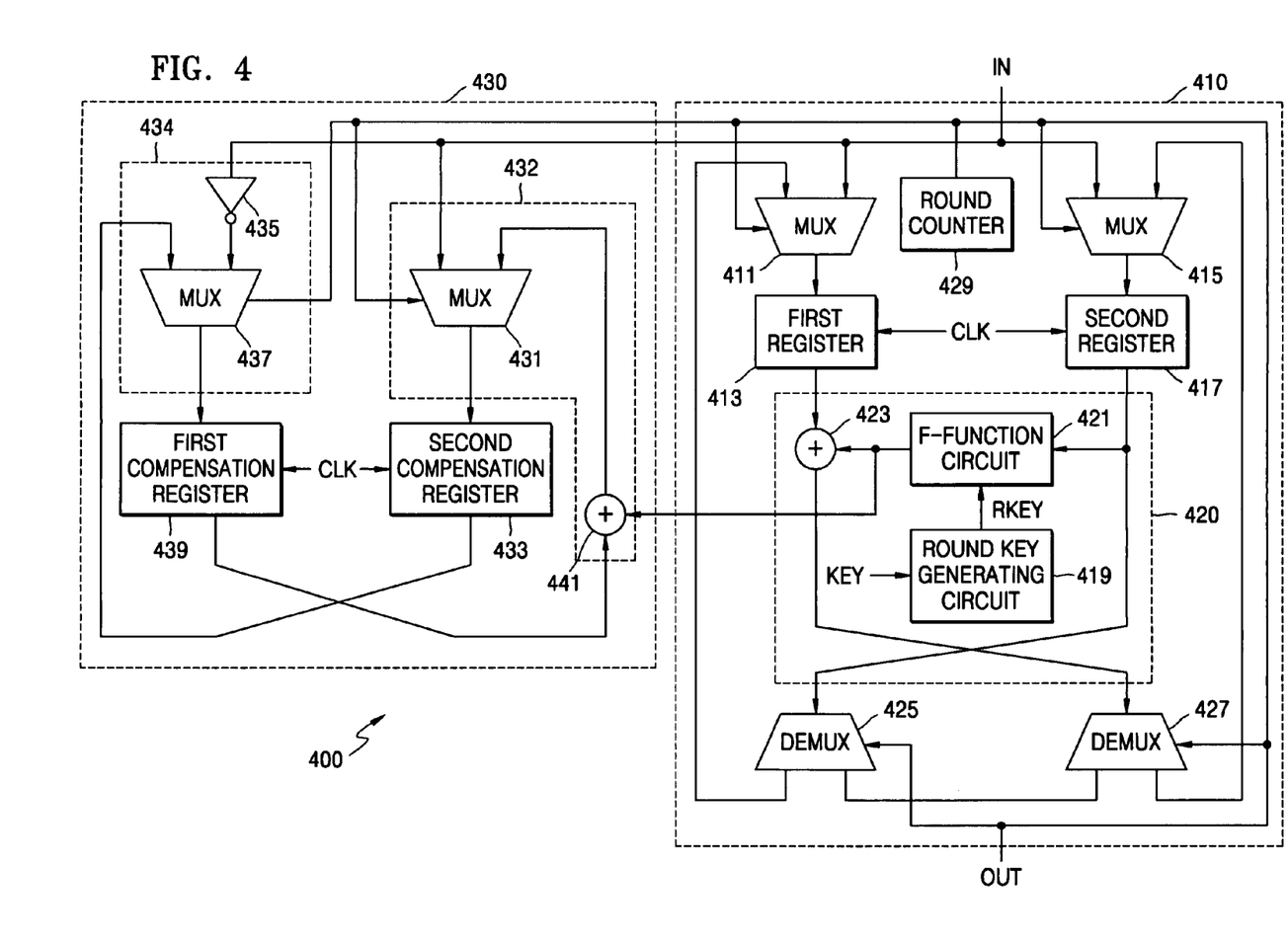
FIG. 4 is a block diagram of a cryptographic system having a Feistel structure according to an example embodiment of the present invention.

FIG. 4 is a block diagram of a cryptographic system having a Feistel structure according to an example embodiment of the present invention. The cryptographic system 400 uses a block encryption algorithm having a Feistel structure. In an encryption algorithm having a Feistel structure, data is encrypted by being divided into two blocks.

A block encryption algorithm having a Feistel structure (hereinafter, referred to as a 'Feistel encryption algorithm') is well known. Typical standards of the Feistel encryption algorithm are a DES encryption algorithm and a SEED encryption algorithm. Both of the DES encryption algorithm and the SEED encryption algorithm have a 16-round Feistel structure.

Referring to FIG. 4, the cryptographic system 400 may include an encryption unit 410 and a compensation unit 430. Data may be encrypted after being divided into a first block and a second block. The encryption unit 410 updates and stores the data divided into the first and the second blocks that are encrypted during each round. The compensation unit 430 generates and stores first compensation data compensating for the data of the first block and second compensation data compensating for the data of the second block. The first and second compensation date may be updated and stored during every round.

The first compensation data may be at values for maintaining the sum of the encrypted data of the first block and the Hamming distance of the first compensation data at a constant value. Also, the second compensation data may be at values for maintaining the sum of the encrypted data of the second block and the Hamming distance of the second compensation data at a constant value. Further, the first compensation data and the encrypted data of the first block may be simultaneously stored in response to a clock signal. The second compensation data and the encrypted data of the second block may also be simultaneously stored in response to the clock signal.

As shown in FIG. 4, the encryption unit 410 may include a first input unit 411 and a second input unit 415 to input data of the first and second blocks to be encrypted during every round. In an example, the first and second input units 411, 415 input the first and second blocks of the data to be encrypted in a first round, and input data of each block which has been encrypted in a previous round in the subsequent rounds.

The encryption unit 410 may include a first register 413 and a second register 417 for storing the data input from the first input unit 411 and the second input unit 415, respectively, in response to the clock signal. In the first round, first block and second block of the data to be encrypted are respectively stored in the first register 413 and the second register 417, and the first block and second block of data which have been encrypted in a previous round are updated and stored in the first and second register 413 and 417 in the subsequent rounds. As shown in FIG. 4, input units 410 and 411 may be embodied as multiplexers.

The encryption unit 410 may include an encryption circuit 420. The encryption circuit 420 may include a round key generating circuit 419, an F-function circuit 421 and a first exclusive OR circuit 423. In the present example embodiment, the encryption algorithm may be embodied as a Feistel encryption algorithm. Implementation of the Feistel encryption algorithm is known to those of ordinary skill in the art; thus a detailed explanation is omitted for purposes of brevity. However, the Feistel encryption algorithm is merely one example, other encryption algorithms may be implemented by the example encryption circuit 420 as is evident to one skilled in the art.

Using a given encryption key (KEY), the round key generating circuit 419 generates a round key (RKEY) that may be used for encryption during each round. The F-function circuit 421 is designed to implement a unique function used for the Feistel encryption algorithm. In an example, if the RKEY in an ith round of the Feistel encryption algorithm is Ki, the values Li and Ri to be stored in the first register 413 and the second register 417, respectively, may be defined by the following expressions (3) and (4).

$$Ri = L(i-1) \,XOR\, f(R(i-1), K(i-1)) \qquad (3)$$

$$Li = R(i-1) \qquad (4)$$

In expressions (3) and (4), L(i−1) and R(i−1) represent the values of data updated and stored in the first register 413 and the second register 417 during the previous round ('i−1'$^{th}$ round), respectively, and 'f(R(i−1), K(i−1))' denotes a unique F-function which is used for the Feistel encryption algorithm.

The F-function circuit 421 may perform a given F-function operation on the data stored in the second register 417 using the RKEY. The first exclusive OR operation circuit 423 may perform an exclusive OR operation on the data stored in the first register 413 and an output of the F-function circuit 421, and may output the result to the second output unit 427, which may be embodied as a demultiplexer, for example.

The encryption circuit 420 outputs data stored in the second register 417 to the first output 425, which may be embodied as a demultiplexer, for example. In the final round, the first output unit 425 may output the encrypted data of the first block, and the second output unit 427 may output the encrypted data of the second block. In the previous rounds, the first output unit 425 may transmit the encrypted data of the first block to the first input unit 411, and the second output unit 427 may transmit the encrypted data of the second block to the second input unit 415.

The encryption unit 410 may include a round counter 429. The round counter 429 counts the number of rounds, and may output the count value to the first and second input units 411 and 415, the first and second output units 425 and 427 and the compensation unit 430 as a control signal. The round counter 429 may be reset in response to the encrypted data being output from the first and second output units 425 and 427. The round counter 429 may begin counting in response to the reception of data to be encrypted. The round counter 429 counts in response to the encrypted data being transmitted from the first and second output units 425 and 427.

The compensation unit 430 may include first and second compensation data generating units 434 and 432 for generating first and second compensation data for compensating for the encrypted data of the first and second blocks, which are updated and stored during every round. The first and second compensation data may alternately have the value of the updated data stored in the first and second registers 413 and 417, respectively, and the inverted value of the updated data.

In the '$i^{th}$' round, if the RKEY is Ki, the first compensation data is CLi and the second compensation data is CRi, CLi and CRi are generated by the following expressions (5) and (6).

$$CRi = CL(i-1) \, XOR \, f(R(i-1), K(i-1)), \text{ and } CR0 = R0 \quad (5)$$

$$CLi = CR(i-1), \text{ and } CL0 = \sim L0 \quad (6)$$

The compensation unit 430 may include a first compensation register 439 and a second compensation register 433. In expressions (5) and (6), CL(i−1) and CR(i−1) denote the values of data stored in the first compensation register 439 and the second compensation register 433 in a previous round ('i−1'$^{th}$ round), respectively. The terms 'f(R(i−1), K(i−1))' denote a unique F-function which is used for the Feistel encryption algorithm. Further, the first compensation register 439 may be initialized to an inverted value (~L0) of the first block data, and the second compensation register 433 may be initialized to a value (R0) of the second block data which is intended to be encrypted.

As described above, in the cryptographic system having a Feistel structure, Li and Ri, which are updated and respectively stored in the first register 413 and the second register 417, may be represented by expression (7).

$$L0R0 \rightarrow L1R1 \rightarrow L2R2 \rightarrow L3R3 \rightarrow L4R4 \rightarrow \quad (7)$$

In addition, CLi and Cri, which are updated and respectively stored in the first compensation register 439 and the second compensation register 433, may be represented by expression (8).

$$\sim L0R0 \rightarrow L1 \sim R1 \rightarrow \sim L2R2 \rightarrow L3 \sim R3 \rightarrow \sim L4R4 \rightarrow \quad (8)$$

In other words, in the example cryptographic system 400, the Hamming distance of the updated data stored in the registers 413, 417, 439 and 433 may be maintained constant during every round.

The first and second compensation registers 439 and 433 thus store the first and second compensation data, which are generated in response to the clock signal. To preserve a constant Hamming distance, the first and second compensation data and the encrypted data of the first and second blocks may be stored simultaneously in the first and second registers 413 and 417 and the first and second compensation registers 439 and 433, respectively, in response to the clock signal.

The first compensating generating unit 434 may include an inverting unit 435 and a first selecting unit 437. The inverting unit 435 inverts the first block of the data to be encrypted. The first selecting unit 437 selects either the output of the inverting unit 435 or the output of the second compensation register 433. The first compensation register 439 may be initialized to the inverted value of the first block of original data to be encrypted. Therefore, the first selecting unit 437 selects the output of the inverting unit 435 only in the first round, and selects the output of the second compensation register 433 in all subsequent rounds.

The second compensation data generating unit 432 may include a second selecting unit 431 and a second exclusive OR circuit 441. The second selecting unit 431 selects either the second block of the data to be encrypted or the output of the second exclusive OR circuit 441 based on the round number. The second compensation register 433 may be initialized to the value of the second block of original data to be encrypted. Therefore, the second selecting unit selects the second block of the data to be encrypted only in the first round, and selects the output of the second exclusive OR circuit 441 in all subsequent rounds. The second exclusive OR circuit 441 may perform an exclusive OR operation on the data stored in the first compensation register 439 and on the output of the F-function circuit 421 and outputs the result as the second compensation data.

Figure 5:
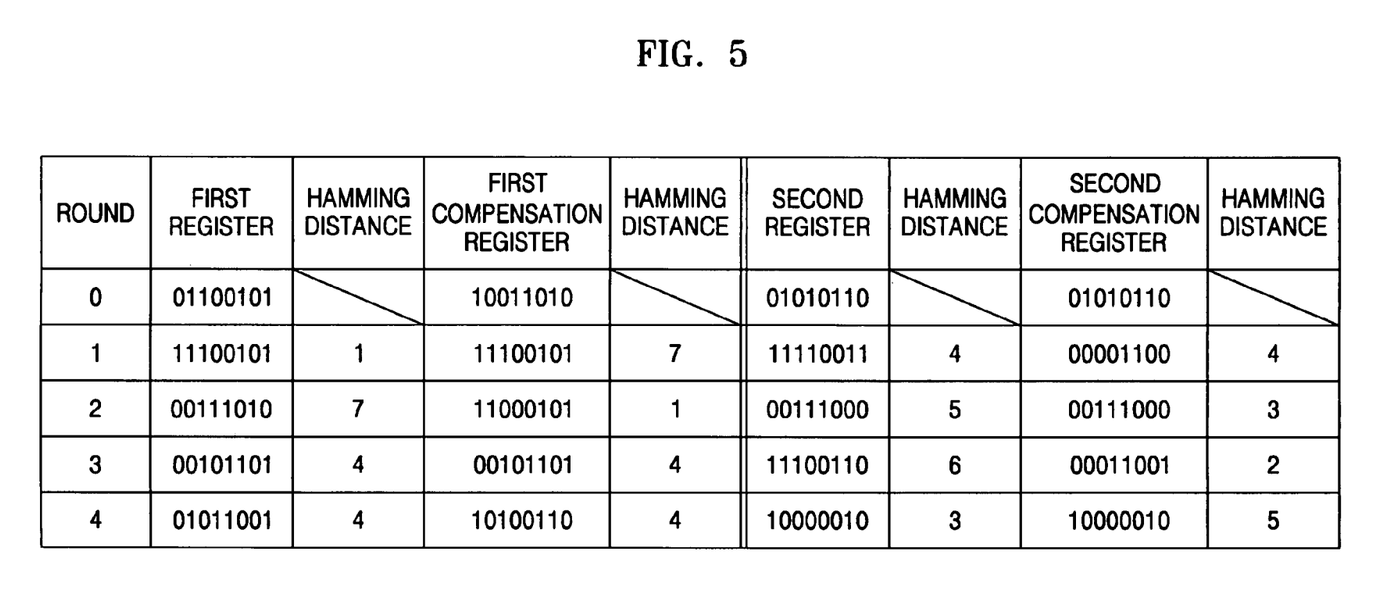
FIG. 5 is a table showing data values stored in the cryptographic system illustrated in FIG. 4.

FIG. 5 is a table showing data values stored in the cryptographic system 400 illustrated in FIG. 4. For purposes of explaining FIG. 5, it may be assumed that the size of each of the first and second registers 413 and 417 and the first and second compensation registers 439 and 433 is 8 bits and the Hamming distance of the total system is 16.

Referring to FIG. 5, the first register 413 may be initialized to data (01100101) intended to be encrypted, the first compensation register 439 may be initialized to the inverted data (10011010) of the first register 413, and the second register 417 and the second compensation register 433 may be initialized to the data (01010110) to be encrypted.

In the first round, if data values generated by encrypting the data stored in the first register 413 and the second register 417 using the Feistel encryption algorithm are respectively '11100101' and '11110011', the encrypted data values (11100101 and 11110011) are updated and stored in the first and second registers, respectively. Meanwhile, a value is generated by inverting the encrypted value two times. In other words, the value of the encrypted data (11100101) stored in the first register 413 is stored in the first compensation register 439, and the inverted value (00001100) of the encrypted data stored in the second register 417 is stored in the second compensation register 433.

At this time, the Hamming distance of the data (01100101→11100101) which is updated and stored in the first register 413 is 1 bit, and the Hamming distance of the data (10011010→11100101) which is updated and stored in the first compensation register 439 is 7 bits. In addition, the Hamming distance of the data (01010110→11110011) which is updated and stored in the second register 417 is 4 bits, and the Hamming distance of the data (01010110→00001100) which is updated and stored in the second compensation register 433 is 4 bits. Therefore, the total Hamming distance of the data updated and stored in the first register 413 and first compensation register 439 is 8 bits, and the total Hamming distance of the data updated and stored in the second register 417 and second compensation register 433 is also 8 bits. Thus, the total Hamming distance of the data updated and stored in registers 413, 417, 439 and 433 is 16 bits.

In the second round, if values generated by encrypting the data (11100101 and 11110011) stored in the first and second registers 413 and 417 using the Feistel encryption algorithm are respectively '00111010' and 100111000', the encrypted values (00111010 and 00111000) are updated and stored in the first and second registers 413 and 417, respectively. Meanwhile, a value is generated by inverting the encrypted data stored in the first register 413 three times. In other words, the inverted value (11000101) of the encrypted data stored in the first register 413 is stored in the first compensation register 439, and a value which is generated by inverting the encrypted data two times, i.e., the value of the encrypted data (00111000) stored in the second register 417 is stored in the second compensation register 433.

At this time, the Hamming distance of the data (11100101→00111010) which is updated and stored in the first register 413 is 7 bits, and the Hamming distance of the data (11100101→11000101) which is updated and stored in the first compensation register 439 is 1 bit. Also, the Hamming distance of the data (11110011→00111000) which is updated and stored in the second register 417 is 5bits, and the Hamming distance of the data (00001100→00111000) which is updated and stored in the second compensation register 433 is 3 bits. Thus, the total Hamming distance of the data updated and stored in the first register 413 and first compensation register 439 is 8 bits, and the total Hamming distance of data updated and stored in the second register 417 and second compensation register 433 is also 8 bits. Thus, the total Hamming distance of the data updated and stored in registers 413, 417, 439 and 433 is 16 bits, identical to the Hamming distance of the data updated and stored in the first round.

In each subsequent round, the data updated and stored in the first compensation register 439 and the second compensation register 433 alternately have the value of the data stored in the first register 413 and the second resister 417 and the inverted value of the data stored in the first and second registers 413 and 417. Thus, the total Hamming distance of the data updated and stored in registers 413, 417, 439, and 433 are always maintained at a constant 16 bits.

Figure 6:
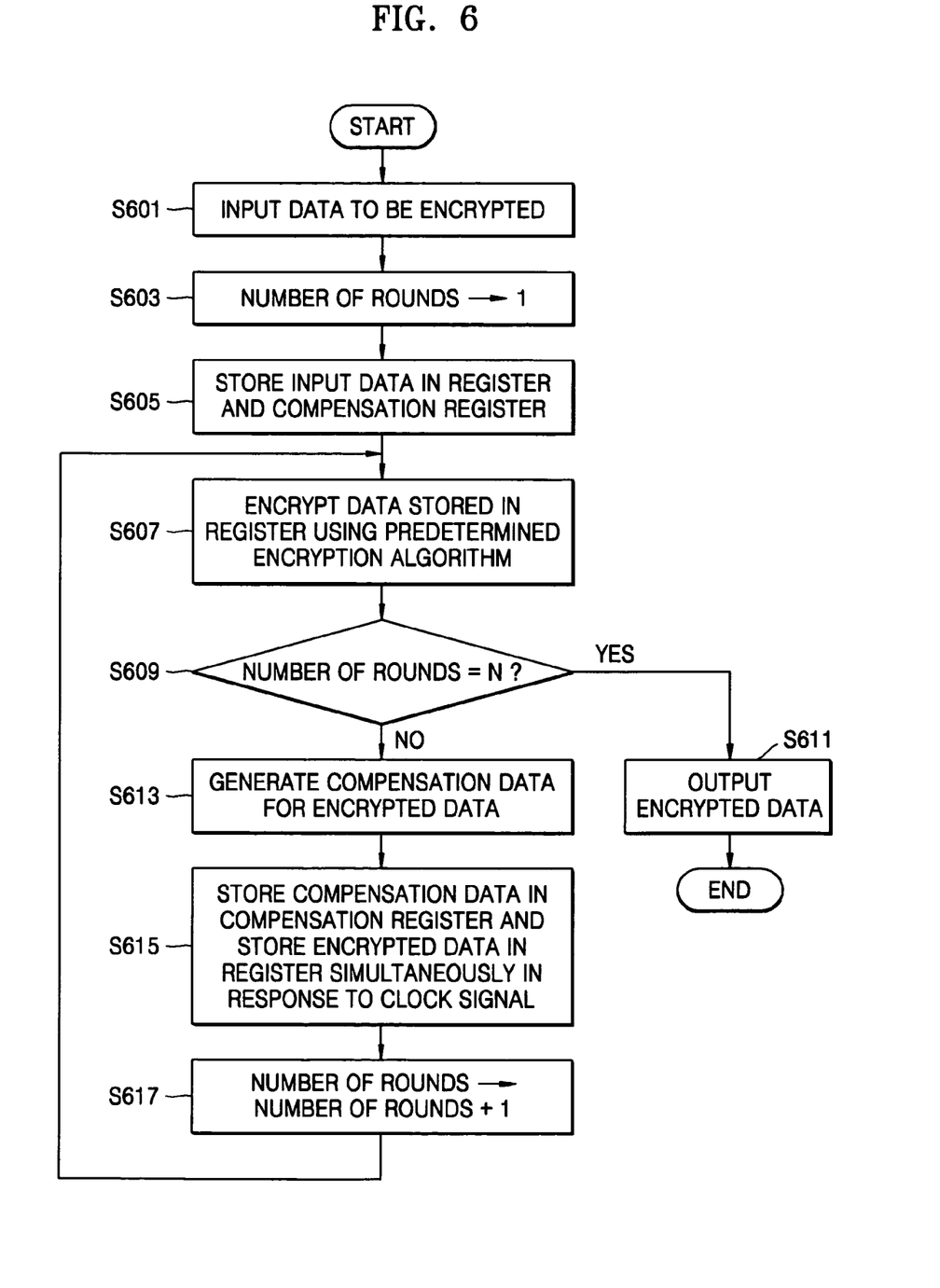
FIG. 6 is a flowchart illustrating a method for encrypting input data according to an example embodiment of the present invention.

FIG. 6 is a flowchart illustrating a method of encrypting input data according to an example embodiment of the present invention. As shown in FIG. 6, as input data to be encrypted is input (S601), the number of rounds is set to 1 (S603), and the input data is stored in a register and a compensation register at the same time (S605) in response to a clock signal. The data stored in the register may be encrypted (S607) using a given encryption algorithm.

After the data is encrypted, whether the round number is identical to a given round number is determined (operation S609). If the round number is identical to the given number, and since the encryption of data is completed according to the given encryption algorithm, the encrypted data is output (S61 1). However, if the round number is not identical to the given round number, the encryption of data is executed in a subsequent round. To execute the encryption in the subsequent round, compensation data for the encrypted data is generated (S613).

After the compensation data is generated, and in response to a clock signal, the compensation data is stored in the compensation register simultaneously with the encrypted data being stored in a register (S615). After the encrypted data is stored in the register, the number of rounds is increased (S617) by 1, so as to execute the encryption in the subsequent round in returning to operation S607.

Although described primarily in terms of hardware above, the example methodology implemented by one or more components of the example system described above may also be embodied in software as a computer program. For example, a program in accordance with the example embodiments of the present invention may be a computer program product causing a computer to execute a method of encrypting input data by implementing a given encryption algorithm with a repeated round structure, as described above.

The computer program product may include a computer-readable medium having computer program logic or code portions embodied thereon for enabling a processor of the system to perform one or more functions in accordance with the example methodology described above. The computer program logic may thus cause the processor to perform the example method, or one or more functions of the example method described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAM, ROM, flash memories and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal embodied in a carrier wave. The computer data signal embodying one or more instructions or functions of the example methodology may be carried on a carrier wave for transmission and/or reception by an entity that executes the instructions or functions of the example methodology. For example, the functions or instructions of the example method may be implemented by processing one or more code segments of the carrier wave in a computer controlling one or more of the components of the example system of FIGS. 2 and/or 4, where instructions or functions may be executed for encrypting data and generating compensation data, in accordance with the example method outlined in any of FIGS. 2, 4 or 6.

Further, such programs, when recorded on computer-readable storage media, may be readily stored and distributed. The storage medium, as it is read by a computer, may enable the processing of multimedia data signals prevention of copying these signals, allocation of multimedia data signals within an apparatus configured to process the signals, and/or the reduction of communication overhead in an apparatus configured to process multiple multimedia data signals, in accordance with the example method described herein.

Therefore, the example cryptographic systems and methods may be secure against a simple power analysis attack and a differential power analysis attack, which infer secret information by measuring the power consumption of a cryptographic system. Also, the example cryptographic systems and methods described herein may prevent information leakage due to variations in the Hamming distance of encrypted data, which is updated and stored in a register. The example embodiments may thus be applicable to any cryptographic system having a repeated-round structure, for example, although the example embodiments are not so limited to repeated-round cryptographic systems and/or methodologies.

Thus, the example embodiments provide a cryptographic system and method which may be configured to maintain a constant Hamming distance by updating and storing compensation data at the same time the encrypted data is updated and stored in a given round or processing iteration, thereby preventing a change in current generated due to variations in the Hamming distance. Further, the example cryptographic systems and methods may be applied to a standard encryption system, such as a DES encryption system or a SEED encryption system, for example, which uses a block encryption algorithm with a Feistel structure.

The example embodiments of the present invention being thus described, it will be obvious that the same may be varied in many ways. For example, the functional blocks of FIGS. 2, 4 and 6 describing the exemplary system and/or method may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations or functions. The computer executable program(s) may also be provided as part of externally supplied propagated signal(s). Such variations are not to be regarded as departure from the spirit and scope of the example embodiments of the present invention, and all such modifications as would be obvious to one skilled in the art are intended to be included within the scope of the following claims.

What is claimed is:

1. A cryptographic system for encrypting input data in accordance with an encryption algorithm having a repeated-round structure, comprising:
   an encryption unit updating and storing encrypted data in accordance with the encryption algorithm in each given round, and outputting the encrypted data after executing encryption for a given number of rounds, and
   a compensation unit generating and storing compensation data so that a sum of a Hamming distance for the updated and stored encrypted data and a Hamming distance of the compensation data is maintained at a constant value, wherein the compensation unit includes:
      a compensation data generating unit generating the compensation data based on the number of rounds performed, and
      a compensation register storing the compensation data in response to a clock signal,
   wherein the compensation data generating unit includes:
      an inverting unit inverting the encrypted data,
      a first selecting unit selecting and outputting one of the encrypted data and inverted data of the encrypted data, based on the number of rounds performed, and
      a second selecting unit selecting and outputting one of data output from the first selecting unit and the input data based on the number of rounds performed.

2. The system of claim 1, wherein the encryption unit includes:
   an input unit receiving data to be encrypted based on the number of rounds to be performed,
   a register storing data output from the input unit in response to a clock signal,
   an encryption circuit encrypting the stored data in accordance with the encryption algorithm, and
   an output unit outputting the encrypted data based on the number of rounds performed.

3. The system of claim 2, wherein the input unit receives the input data if the number of rounds performed is 0 and receives the encrypted data when the number of rounds performed is greater than 0.

4. The system of claim 2, wherein the output unit outputs the encrypted data if the number of rounds performed is identical to the given number of rounds, else transmits the encrypted data to the input unit and the compensation unit if the number of rounds is less than the given number of rounds.

5. The system of claim 1, wherein the first selecting unit selects the encrypted data if the number of rounds performed is odd, else selects the inverted data if the number of rounds performed is even.

6. The system of claim 1, wherein the second selecting unit selects the input data if the number of rounds performed is 0, else selects the data output from the first selecting unit if the number of rounds performed is greater than 0.

7. The system of claim 1, wherein the encryption algorithm is embodied as a data encryption standard (DES) encryption algorithm.

8. The system of claim 1, wherein the compensation data alternately has the same value as the data updated and stored in each round and an inverted value of the data updated and stored in each round.

9. The system of claim 1, wherein the compensation data compensates for the updated and stored data and is set at values so that the sum is maintained at the constant value in each round.

10. A cryptographic system for encrypting input data by dividing the input data into a first block and a second block in accordance with an encryption algorithm having a repeated-round structure, comprising:
    an encryption unit updating and storing data, in each round, for each of the first and second blocks encrypted in accordance with the encryption algorithm, and outputting the encrypted data after executing encryption for a given number of rounds, and
    a compensation unit generating and storing first compensation data and second compensation data such that the sum of a Hamming distance for the updated and stored data of the first block and first compensation data is maintained at a constant value, and the sum of the Hamming distance for the updated and stored data of the second block and the second compensation data is maintained at a constant value,
    wherein the compensation unit includes:
       a first compensation data generating unit generating the first compensation data based on the number of rounds performed,
       a second compensation data generating unit generating the second compensation data based on the number of rounds performed,
       a first compensation register storing the first compensation data based on a clock signal, and
       a second compensation register storing the second compensation data based on the clock signal.

11. The system of claim 10, wherein the encryption unit includes:
    a first input unit receiving data of the first block to be encrypted based on the number of rounds performed,
    a second input unit receiving data of the second block to be encrypted based on the number of rounds performed,
    a first register storing data output from the first input unit based on a clock signal, a second register storing data output from the second input unit based on the clock signal, an encryption circuit encrypting the data stored in the first and second registers in accordance with the encrypting algorithm, a first output unit outputting encrypted data of the first block based on the number of rounds performed, and a second output unit outputting encrypted data of the second block based on the number of rounds performed.

12. The system of claim 11, wherein the first input unit receives the first block of the input data if the number of rounds performed is 0 and receives the encrypted data of the first block if the number of rounds performed is greater than 0, and the second input unit receives the second block of the input data if the number of rounds performed is 0 and receives the encrypted data of the second block if the number of rounds performed is greater than 0.

13. The system of claim 11, wherein the first output unit outputs the encrypted data of the first block if the number of rounds performed is identical to the given number of rounds, and transmits the encrypted data of the first block to the first input unit and the compensation unit if the number of rounds performed is less than the given number of rounds, and the second output unit outputs the encrypted data of the second block if the number of rounds performed is identical to the given number of rounds, and transmits the encrypted data of the second block to the second input unit and the compensation unit if the number of rounds performed is less than the given number of rounds.

14. The system of claim 10, wherein the first compensation data generating unit includes:

an inverting unit inverting the first block of the input data, and a first selecting unit selecting and outputting one of the data stored in the second compensation register and data output from the inverting unit, based on the number of rounds performed.

15. The system of claim 14, wherein the first selecting unit selects the data output from the inverting unit if the number of rounds performed is 0, else selects the data stored in the second compensation register if the number of rounds performed is greater than 0.

16. The system of claim 10, wherein the second compensation data generating unit includes:

an exclusive OR circuit performing an exclusive OR operation on the output of the first compensation register and given data used for the given encryption algorithm, and a second selecting unit selecting and outputting one of the second block of the input data and data output from the exclusive OR circuit, based on the number of rounds performed.

17. The system of claim 16, wherein the second selecting unit selects the second block of the encrypted data if the number of rounds performed is 0, else selects either data output from the exclusive OR operation circuit if the number of rounds performed is greater than 0.

18. The system of claim 10, wherein the encryption algorithm is embodied as a Feistel encryption algorithm.

19. The system of claim 10, wherein the first compensation data alternately has the same value as the data of the first block and an inverted value of the data of the first block in consecutive rounds, and the second compensation data alternately has the same value as the data of the second block and an inverted value of the data of the second block in consecutive rounds.

20. The system of claim 10, wherein the first compensation data compensates for the updated and stored data of the first block and the second compensation data compensates for the updated and stored data of the second block, and the first compensation data and second compensation data are set at values so that the sum is maintained at the constant value in each round.

* * * * *